US011113054B2

(12) United States Patent
Chavan et al.

(10) Patent No.: US 11,113,054 B2
(45) Date of Patent: Sep. 7, 2021

(54) EFFICIENT HARDWARE INSTRUCTIONS FOR SINGLE INSTRUCTION MULTIPLE DATA PROCESSORS: FAST FIXED-LENGTH VALUE COMPRESSION

(71) Applicant: Oracle International Corporation, Redwood Shores, CA (US)

(72) Inventors: Shasank K. Chavan, Menlo Park, CA (US); Phumpong Watanaprakornkul, Bangkok (TH); Victor Chen, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 128 days.

(21) Appl. No.: 15/211,418

(22) Filed: Jul. 15, 2016

(65) Prior Publication Data

US 2017/0060587 A1 Mar. 2, 2017

Related U.S. Application Data (60) Provisional application No. 62/210,959, filed on Aug. 27, 2015.

(51) Int. Cl.
*G06F 9/30* (2018.01)
*G06F 15/80* (2006.01)

(52) U.S. Cl.
CPC ........ *G06F 9/30036* (2013.01); *G06F 9/3004* (2013.01); *G06F 9/30018* (2013.01); *G06F 9/30032* (2013.01); *G06F 9/30043* (2013.01); *G06F 15/8053* (2013.01)

(58) Field of Classification Search
None
See application file for complete search history.

(56) References Cited

U.S. PATENT DOCUMENTS

| | | | |
|---|---|---|---|
| 4,626,829 A | 12/1986 | Hauck | |
| 5,109,226 A | 4/1992 | MacLean | |
| 5,175,810 A | 12/1992 | Young et al. | |
| 5,287,193 A | 2/1994 | Lin | |
| 5,511,190 A | 4/1996 | Sharma et al. | |
| 5,592,622 A | 1/1997 | Isfeld | |
| 5,655,080 A | 8/1997 | Dias et al. | |

(Continued)

FOREIGN PATENT DOCUMENTS

| | | |
|---|---|---|
| CN | 1711563 A | 12/2005 |
| CN | 101251791 A | 8/2008 |

(Continued)

OTHER PUBLICATIONS

Schlegel et al.; Fast Integer Compression using SIMD Instructions; 2010; ACM.*

(Continued)

*Primary Examiner* — Corey S Faherty
(74) *Attorney, Agent, or Firm* — Hickman Becker Bingham Ledesma LLP (57) ABSTRACT

Methods and apparatuses for determining set-membership using Single Instruction Multiple Data ("SIMD") architecture are presented herein. Specifically, methods and apparatuses are discussed for compressing or packing, in parallel, multiple fixed-length values into a stream of multiple variable-length values using SIMD architecture.

34 Claims, 3 Drawing Sheets

(56) References Cited

U.S. PATENT DOCUMENTS

| | | |
|---|---|---|
| 5,675,382 A | 10/1997 | Bauchspies |
| 5,696,956 A | 12/1997 | Guttag |
| 5,696,959 A | 12/1997 | Guttag |
| 5,706,495 A | 1/1998 | Chadha et al. |
| 5,884,299 A | 3/1999 | Ramesh |
| 5,884,229 A | 5/1999 | Ramesh et al. |
| 5,996,708 A | 12/1999 | Gerold |
| 6,065,070 A | 5/2000 | Johnson |
| 6,118,724 A | 9/2000 | Higginbottom |
| 6,161,173 A | 12/2000 | Krishna |
| 6,178,405 B1 | 1/2001 | Ouyang |
| 6,219,457 B1 | 4/2001 | Potu |
| 6,331,826 B1 | 12/2001 | Wagner |
| 6,336,180 B1 | 1/2002 | Long |
| 6,381,601 B1 | 4/2002 | Fujiwara et al. |
| 6,416,410 B1 | 7/2002 | Abou-Samra |
| 6,496,915 B1 | 12/2002 | Halleck |
| 6,604,155 B1 | 8/2003 | Chong et al. |
| 6,779,105 B1 | 8/2004 | Bouyoux |
| 6,829,697 B1 | 12/2004 | Davis et al. |
| 6,996,569 B1 | 2/2006 | Bedell et al. |
| 7,020,661 B1 | 3/2006 | Cruanes |
| 7,490,221 B2 | 2/2009 | Evans |
| 7,617,346 B2 | 11/2009 | Wang et al. |
| 7,861,060 B1 | 12/2010 | Nickolls et al. |
| 8,244,780 B1 | 8/2012 | Narayanan |
| 8,375,145 B2 | 2/2013 | Kagan et al. |
| 8,589,613 B2 | 11/2013 | Griggs |
| 8,667,252 B2 | 3/2014 | Colavin et al. |
| 9,405,476 B2 | 8/2016 | Joshi et al. |
| 9,432,298 B1 | 8/2016 | Smith |
| 9,658,675 B1 | 5/2017 | Witek |
| 9,658,676 B1 | 5/2017 | Witek |
| 9,977,664 B2 | 5/2018 | Toyama |
| 2001/0037345 A1 | 11/2001 | Kiernan et al. |
| 2002/0032678 A1 | 3/2002 | Cornwell et al. |
| 2002/0033762 A1 | 3/2002 | Belu |
| 2002/0091826 A1 | 7/2002 | Comeau |
| 2002/0091905 A1 | 7/2002 | Krishna |
| 2002/0095562 A1 | 7/2002 | Nakanishi |
| 2002/0154154 A1 | 10/2002 | Cornelius |
| 2002/0165896 A1 | 11/2002 | Kim |
| 2003/0135495 A1 | 7/2003 | Vagnozzi |
| 2003/0182464 A1 | 9/2003 | Hamilton |
| 2003/0187858 A1 | 10/2003 | Kirk et al. |
| 2004/0068642 A1 | 4/2004 | Tanaka |
| 2004/0160446 A1 | 8/2004 | Gosalia |
| 2005/0055384 A1 | 3/2005 | Ganesh |
| 2005/0071322 A1 | 3/2005 | Chen |
| 2005/0091256 A1 | 4/2005 | Rathakrishnan et al. |
| 2006/0116989 A1 | 6/2006 | Bellamkonda et al. |
| 2006/0179255 A1 | 8/2006 | Yamazaki |
| 2006/0218194 A1 | 9/2006 | Yalamanchi |
| 2007/0061600 A1 | 3/2007 | Kuroda |
| 2007/0074214 A1 | 3/2007 | Ueno |
| 2007/0260579 A1 | 11/2007 | Bae |
| 2008/0086480 A1 | 4/2008 | Srivastava |
| 2008/0086495 A1 | 4/2008 | Kizitunc |
| 2008/0134213 A1 | 6/2008 | Alverson |
| 2009/0028192 A1 | 1/2009 | Rieger |
| 2009/0055350 A1 | 2/2009 | Branish et al. |
| 2009/0094193 A1 | 4/2009 | King et al. |
| 2009/0235047 A1 | 9/2009 | Hachmann |
| 2009/0287628 A1 | 11/2009 | Indeck |
| 2009/0287637 A1 | 11/2009 | Day et al. |
| 2009/0313210 A1 | 12/2009 | Bestgen et al. |
| 2009/0319550 A1 | 12/2009 | Shau et al. |
| 2010/0020880 A1 | 1/2010 | Susnow |
| 2010/0030728 A1 | 2/2010 | Chakkappen et al. |
| 2010/0082705 A1 | 4/2010 | Bhashyam et al. |
| 2010/0088309 A1 | 4/2010 | Petculescu et al. |
| 2010/0106944 A1 | 4/2010 | Symes |
| 2010/0115295 A1 | 5/2010 | Diab |
| 2010/0161646 A1 | 6/2010 | Ceballos et al. |
| 2010/0191918 A1 | 7/2010 | Lee et al. |
| 2010/0257391 A1 | 10/2010 | Dring |
| 2010/0281004 A1 | 11/2010 | Kapoor |
| 2010/0281013 A1 | 11/2010 | Graefe |
| 2011/0106804 A1 | 5/2011 | Keeler et al. |
| 2011/0119249 A1 | 5/2011 | Flatz |
| 2011/0228325 A1 | 9/2011 | Shiraishi |
| 2011/0302151 A1 | 12/2011 | Abadi |
| 2012/0005509 A1 | 1/2012 | Araki |
| 2012/0014265 A1 | 1/2012 | Schlansker |
| 2012/0054225 A1 | 3/2012 | Marwah et al. |
| 2012/0071152 A1 | 3/2012 | Roundtree |
| 2012/0159448 A1 | 6/2012 | Arcese |
| 2012/0166447 A1 | 6/2012 | Nice |
| 2012/0197868 A1 | 8/2012 | Fauser |
| 2012/0209873 A1 | 8/2012 | He |
| 2012/0234908 A1 | 9/2012 | Wang |
| 2012/0310916 A1 | 12/2012 | Abadi |
| 2013/0151458 A1 | 6/2013 | Indeck |
| 2013/0275364 A1 | 10/2013 | Wang |
| 2014/0013076 A1* | 1/2014 | Ganesh ............ G06F 17/30315 |
| | | 712/4 |
| 2014/0052713 A1 | 2/2014 | Schauer et al. |
| 2014/0052726 A1 | 2/2014 | Amberg et al. |
| 2014/0068183 A1 | 3/2014 | Joshi |
| 2014/0074818 A1 | 3/2014 | Barber |
| 2014/0208138 A1 | 7/2014 | Homchaudhuri |
| 2014/0208331 A1 | 7/2014 | Li |
| 2014/0214796 A1 | 7/2014 | Barber |
| 2014/0279838 A1 | 9/2014 | Tsirogiannis |
| 2014/0281354 A1 | 9/2014 | Tkacik |
| 2014/0304490 A1 | 10/2014 | Toyama |
| 2015/0046411 A1 | 2/2015 | Kazmaier |
| 2015/0074384 A1 | 3/2015 | Yajima |
| 2015/0120698 A1 | 4/2015 | Plattner |
| 2015/0181273 A1 | 6/2015 | Shaool |
| 2015/0227585 A1 | 8/2015 | Braham |
| 2015/0261535 A1 | 9/2015 | Snyder, II |
| 2016/0007037 A1 | 1/2016 | Zhao et al. |
| 2016/0246811 A1 | 8/2016 | Ackerman |
| 2016/0253379 A1 | 9/2016 | Ford |
| 2016/0285623 A1 | 9/2016 | Yoon |
| 2016/0350347 A1 | 12/2016 | Das et al. |
| 2016/0352342 A1 | 12/2016 | Fujiwara |
| 2017/0024435 A1 | 1/2017 | Kociubes et al. |
| 2017/0039238 A1 | 2/2017 | Elias |
| 2017/0085378 A1 | 3/2017 | Shields |
| 2017/0108552 A1 | 6/2017 | Ueda |
| 2017/0185527 A1 | 6/2017 | Ueda |
| 2017/0270052 A1 | 9/2017 | Brown et al. |
| 2017/0270053 A1 | 9/2017 | Brown |
| 2017/0272231 A1 | 9/2017 | Chen |
| 2017/0322725 A1 | 11/2017 | Klingenberg |
| 2018/0004242 A1 | 1/2018 | Suresh |
| 2018/0004581 A1 | 1/2018 | Brown |
| 2018/0067889 A1 | 3/2018 | Brown |
| 2018/0101530 A1 | 4/2018 | Brown |
| 2018/0107627 A1 | 4/2018 | LeBeane et al. |
| 2018/0232417 A1 | 8/2018 | Das |

FOREIGN PATENT DOCUMENTS

| | | |
|---|---|---|
| CN | 10930358 A | 12/2010 |
| CN | 10217695 A | 8/2011 |
| GB | 2 306 868 A | 5/1997 |
| GB | 2338095 A | 12/1999 |
| JP | 2003 271541 A | 9/2003 |
| WO | WO 2011/040928 A1 | 4/2011 |

OTHER PUBLICATIONS

Anonymous:, "Hash Table—Wikipedia, the free encyclopedia", dated Jun. 20, 2012, retrieved from the internet: http://wayback.archive.org/wiki/harshtable, 18 pages.

Ganesh, U.S. Appl. No. 14/023,064, filed Sep. 10, 2013, Notice of Allowance, dated Jun. 16, 2017.

Chavan, U.S. Appl. No. 14/3385,219, filed Jul. 22, 2014, Office Action, dated Jun. 2, 2017.

(56) References Cited

OTHER PUBLICATIONS

Brooks, U.S. Appl. No. 14/867,929, filed Sep. 28, 2015, Office Action, dated Jul. 13, 2017.
Chavan, U.S. Appl. No. 14/338,219, filed Jul. 22, 2014, Notice of Allowance, dated Sep. 25, 2017.
Chavan, U.S. Appl. No. 14/338,219, filed 047/22/2014, Interview Summary, dated Sep. 11, 2017.
Brown, U.S. Appl. No. 15/074,248, filed Mar. 18, 2016, Office Action, dated Sep. 25, 2017.
Brown, U.S. Appl. No. 15/073,905, filed Mar. 18, 2016, Office Action, dated Sep. 25, 2017.
Coprocessor Wizard, Platform Studio, http://www.xilinx.com/itp/xilinx10/help/platform_studio/ps_c_cpw-coprocessor_wizard.htm, 2008, 2 pages.
Binkert et al., "A Simple Integrated Network Interface for High-Bandwidth Servers", dated Jan. 2006, 22 pages.
Das, U.S. Appl. No. 14/806,614, filed Jul. 22, 2015, Office Action, dated Dec. 6, 2017.
Brown, U.S. Appl. No. 15/197,436, filed Jun. 29, 2016, Office Action, dated Nov. 29, 2017.
U.S. Appl. No. 13/590,110, filed Aug. 20, 2012, Office Action, dated Apr. 14, 2016.
U.S. Appl. No. 13/590,057, filed Aug. 20, 2012, Advisory Aciton, dated Feb. 26, 2015.
U.S. Appl. No. 13/590,057, filed Aug. 20, 2012, Final Office Action, dated Oct. 19, 2015.
U.S. Appl. No. 13/590,057, filed Aug. 20, 2012, Final Office Action, dated Nov. 18, 2014.
U.S. Appl. No. 13/590,057, filed Aug. 20, 2012, Notice of Allowance, dated Sep. 30, 2016.
U.S. Appl. No. 13/590,057, filed Aug. 20, 2012, Office Action, dated Apr. 22, 2015.
U.S. Appl. No. 13/590,0547, filed Aug. 20, 2012, Advisory Action, dated Feb. 11, 2016.
U.S. Appl. No. 13/590,110, filed Aug. 20, 2012, Final Office Action, dated Mar. 27, 2015.
U.S. Appl. No. 13/590,057, filed Aug. 20, 2012, Advisory Action, dated Feb. 11, 2016.
U.S. Appl. No. 13/590,110, filed Aug. 20, 2012, Office Action, dated Jul. 1, 2014.
U.S. Appl. No. 13/590,110, filed Aug. 20, 2012, Office Action, dated Oct. 2, 2015.
U.S. Appl. No. 13/590,110, filed Aug. 20, 2012, Office Action, dated Dec. 18, 2013.
U.S. Appl. No. 13/590,110, filed Aug. 20, 2012, Notice of Allowance, dated Aug. 1, 2016.
U.S. Appl. No. 13/590,057, filed Aug. 20, 2012, Office Action, dated Jan. 7, 2014.
U.S. Appl. No. 13/590,057, filed Aug. 20, 2012, Office Action, dated Jul. 1, 2014.
Thekkath et al., "Separating Data and Control Transfer in Distributed Operating Systems", ASPLOS, San Jose, ACM, dated 1994, 10 pages.

O'Brien, Frank, "The Appollo Guidance Computer-Architecture and Operation", dated 2010, Springer, pp. 27-28, 54, 76 and 1414.
Das, U.S. Appl. No. 15/945,733, filed Apr. 4, 2018, Office Action, dated Aug. 9, 2018.
Brown, U.S. Appl. No. 15/290,357, filed Oct. 11, 2016, Office Action, dated Aug. 27, 2018.
Brown, U.S. Appl. No. 15/256,936, filed Sep. 6, 2016, Office Action, dated Sep. 20, 2018.
Brown, U.S. Appl. No. 15/197,436, filed Jun. 29, 2016, Advisory Action, dated Sep. 7, 2018.
Brooks, U.S. Appl. No. 14/867,929, filed Sep. 28, 2015, Advisory Action, dated Aug. 28, 2018.
Brooks, U.S. Appl. No. 14/867,929, filed Sep. 28, 2015, Interview Summary, dated Apr. 25, 2018.
Brooks, U.S. Appl. No. 14/867,929, filed Sep. 28, 2015, Final Office Action, dated May 31, 2018.
Brown, U.S. Appl. No. 15/362,688, filed Nov. 28, 2016, Notice of Allowance, dated Apr. 25, 2018.
Brown, U.S. Appl. No. 15/073,905, filed Mar. 18, 2016, Notice of Allowance, dated Apr. 24, 2018.
Kociubes, U.S. Appl. No. 14/806,576, filed Jul. 22, 2015, Notice of Allowance, dated Apr. 11, 2018.
Kociubes U.S. Appl. No. 14/806,576, filed Jul. 22, 2015, Interview Summary, dated Feb. 14, 2018.
Das, U.S. Appl. No. 14/806,614, filed Jul. 22, 2015, Notice of Allowance, dated Mar. 20, 2018.
U.S. Appl. No. 15/362,693, filed Nov. 28, 2016, Notice of Allowance, dated Aug. 7, 2018.
Jain, U.S. Appl. No. 15/362,673, filed Nov. 28, 2016, Office Action dated Mar. 28, 2019.
Jain, U.S. Appl. No. 15/364,149, filed Nov. 29, 2016, Notice of Allowance dated Mar. 22, 2019.
Brown, U.S. Appl. No. 15/197,436, filed Jun. 29, 2016, Final Office Action dated Mar. 28, 2019.
Brown, U.S. Appl. No. 15/256,936, filed Sep. 6, 2016, Notice of Allowance dated Mar. 29, 2019.
Jain. U.S. Appl. No. 15/364,149, filed Nov. 29, 2016, Notice of Allowance dated Mar. 24, 2020.
Brown, U.S. Appl. No. 15/290,357, filed Oct. 11, 2016, Notice of Allowance dated May 13, 2020.
Brown, U.S. Appl. No. 15/290,357, filed Oct. 11, 2016, Final Office Action dated Feb. 15, 2019.
Brown, U.S. Appl. No. 15/290,357, filed Oct. 11, 2016, Advisory Action dated Mar. 15, 2019.
Brown, U.S. Appl. No. 15/197,436, filed Jun. 29, 2016, Interview Summary dated Feb. 25, 2019.
Brooks, U.S. Appl. No. 14/867,929, filed Sep. 28, 2015, Office Action dated Mar. 18, 2019.
Brown, U.S. Appl. No. 15/197,436, filed Jun. 29, 2016, Office Action Sep. 18, 2019.
Brown, U.S. Appl. No. 16/457,793, filed Jun. 28, 2019, Office Action dated Sep. 5, 2019.
Brooks, U.S. Appl. No. 14/867,929, filed Sep. 28, 2015, Notice of Allowance dated Aug. 28, 2019.

* cited by examiner

EFFICIENT HARDWARE INSTRUCTIONS FOR SINGLE INSTRUCTION MULTIPLE DATA PROCESSORS: FAST FIXED-LENGTH VALUE COMPRESSION

CROSS-REFERENCE TO RELATED APPLICATIONS; BENEFIT CLAIM

This application claims the benefit of Provisional App. No. 62/210,959, filed Aug. 27, 2015, under 35 U.S.C. § 119(e). The entire contents of each of Provisional App. No. 62/210,959 is hereby incorporated by reference as if fully set forth herein.

The application is related to, and incorporates by reference, the following U.S. applications: U.S. patent application Ser. No. 14/023,064 filed Sep. 10, 2013; U.S. patent application Ser. No. 14/023,249 filed Sep. 10, 2013; and U.S. patent application Ser. No. 14/023,265 filed Sep. 10, 2013.

SUGGESTED GROUP ART UNIT: 2183; SUGGESTED CLASSIFICATION: 712/220.

FIELD OF THE INVENTION

The present invention relates to compression techniques and, more specifically, to parallel compression of fixed-length values using a single instruction multiple data (SIMD) register.

BACKGROUND

Within computer systems, information may be stored in any number of data formats. The algorithms used to process information must take into account the data format in which the information has been encoded. Unfortunately, current processors are not always capable of working with particular data formats efficiently.

Processor designers have historically provided minimal direct support for application specific instructions. An application specific instruction is an instruction supported by a processor that is tailored to benefit a particular application or feature. In contrast, processor designers have historically provided a "reduced" set of instructions that can be used by a wide variety of applications. Software developers have relied on the increasing speed at which existing processors execute a reduced set of instructions to increase performance of a particular algorithm.

The performance of typical processing units, however, is not increasing at the same rate year after year. Thus, software developers are not able to rely as much on increasing computer power to more quickly process particular data formats.

Single instruction multiple data ("SIMD") processors perform the same operation on multiple data items simultaneously. SIMD processors exploit data level parallelism by concurrently executing a single instruction against data in multiple registers or subregisters. Thus, the throughput per instruction may be increased accordingly. SIMD processors are typically used for graphic and other multimedia applications. Outside the context of graphics, it may be difficult to use the SIMD architecture to process particular data formats efficiently.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

TERMS AND NOTATION

For purpose of explanation, the following terms and conventions are used herein to describe embodiments of the invention:

The term "byte" herein describes number of contiguously stored bits. While the common usage implies eight bits, the size of a byte may vary from implementation to implementation. For example a byte may refer to any size including four bits, eight bits, sixteen bits, thirty-two bits, sixty-four bits, and so on.

The notation <XY> herein describes a vector of bits. For example, <10> represents a vector of two bits, the first of which is "1" and the second of which is "0". Spaces and/or commas may be added between bits merely to increase the ability to read the contents of the vector, e.g., <1111 0000, 1111 0000>. To be consistent with the other examples herein, the "lowest" bit or "least significant" bit is the right-most bit. Conversely, the "highest" bit, or "most significant" bit is the left-most bit. In an embodiment bits in a vector bit may be ordered differently.

The notation [J, K] herein describes a vector of contiguous values (each of which may be larger than one bit). In the example [J, K], the vector has two values, and J represents the first value in the vector and K represents the second value in the vector. Elements may be separated by spaces, vertical bars ("|"), commas, or any other character(s) to increase the ability to read and understand the description.

The notation "0x" may be used to denote a hexadecimal number. For example, 0x2C may be used to represent the hexadecimal number 2C, which equals forty-four in base 10. In some embodiments where bit representations may be unwieldy, hexadecimal representations may be used to increase the ability to read and understand the description. Some hexadecimal representations may include spaces between numbers to increase the ability to read and understand the description.

The term "register" refers to a register or subregister that may include one or more smaller subregisters. Unless otherwise specified a register may be a SIMD register or a register typically used in a scalar processor.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Several processes are presented herein for packing fixed-length values into a stream of variable-length values in parallel using SIMD architecture. While the examples illustrated herein focus on satisfying conditions in a database query, the processes and systems discussed herein may be used in other applications using SIMD architecture.

SIMD Instructions

A SIMD instruction is an instruction that, when processed, may cause the same operation to be performed in parallel on multiple distinct data values. For the purpose of illustrating a clear example, assume that each of four integer values is to be incremented by one. Also assume that a SIMD processor receives a single SIMD Increment by One instruction. In response to receiving the single SIMD instruction, the SIMD processor may increment each of the four integer values simultaneously.

In contrast, a scalar instruction is an instruction that, when processed, may cause an operation to be performed on one value. Multiple scalar instructions may be processed serially within a scalar processor, processing unit, or processing core. Assume, for purposes of illustrating a clear example, the same four values in the previous example are to be incremented by one on a scalar processor. The scalar processor may execute a first scalar Increment by One instruction, causing the first value to be incremented by one; then, the scalar processor may execute a second scalar Increment by One instruction, causing the second value to be incremented by one, and so on. Thus, in this example, the scalar processor must execute three more Increment by One instructions than the SIMD processor in the previous example. Furthermore, assume that the scalar processor performs a scalar Increment by One instruction as quickly as the SIMD processor executes a SIMD Increment by One instruction. Because the scalar processor performs scalar instructions serially, and the SIMD processor performs a SIMD instruction on multiple data items in parallel, the scalar processor may take four times as long to process all four values than the SIMD processor.

One approach for implementing a SIMD operation is to use one or more SIMD registers. A SIMD register is a register that is capable of concurrently storing multiple distinct data values. Assume, for purposes of illustrating a clear example, that a SIMD register is capable of storing 256 bits. Accordingly, the SIMD register is capable of storing eight distinct 32-bit values, each in a 32-bit subregister. Alternatively, the same SIMD register may store four distinct 64-bit values, each in a 64-bit subregister; or two distinct 128-bit values, each in a 128-bit subregister. Additionally or alternatively, non-power-of-two sized subregisters may be used.

A SIMD operation implemented in hardware and may take one or more machine cycles to execute. For example, a scalar processor, in response to receiving a Shift Right instruction, may shift bits representing a single value in a register to the right in a single cycle. A SIMD processor, in response to receiving a Shift Right instruction, may shift bits in multiple SIMD registers, or SIMD subregisters, in parallel, in a single cycle. Additionally or alternatively, a SIMD Shift Right instruction may be a Variable Shift Right instruction, which shifts bits to the right in each SIMD subregister, but independently of the other subregisters in the same SIMD register. Additionally or alternatively, one or more SIMD instructions may take more than one cycle to execute.

A computer system that implements both SIMD and non-SIMD instructions may include one or more SIMD registers and one or more non-SIMD registers. A SIMD instruction may operate on or more SIMD and/or non-SIMD instructions, as discussed in detail herein. Additionally or alternatively, a register may be a SIMD register for purposes of executing SIMD instruction and a non-SIMD register for purposes of executing a non-SIMD instruction. Additionally or alternatively, SIMD registers may be on a different hardware element (for example, a different coprocessor) than the hardware element on which non-SIMD registers reside.

Fixed-Length Byte Pack

A SIMD instruction, fixed-length byte pack ("flbpk"), may be used to pack or compress fixed-length byte values into variable-length byte values. Fixed-length values may be padded with extra values so that each value is the same length. For example, 0x2C may be padded with three bytes of 0x00, to make 0x2C four bytes long: 0x00 00 00 2C.

A vector of variable-length values may represent the same values as a vector of fixed-length values, but with fewer bytes than the vector of fixed-length values. For example, in a vector of variable-length values, 0x03 can be represented with a single byte and 0xAABBCCDD can be represented with four bytes, for a total of five bytes. In contrast, in a vector of fixed-length values with the same two values, 0x03 is represented as 0x00000003 with the same number of bytes as 0xAABBCCDD, which in this case is four bytes, for a total of eight bytes. Accordingly, storing a vector of variable-length values may use less memory and/or bandwidth than a vector of fixed-length values.

Executing this instruction stores each value, originally packed in a series of fixed-length contiguous bytes in a register, into a series of variable-length contiguous bytes in a register and/or memory. A pointer may be updated to indicate the next location in memory that a next vector of variable-length values should be stored into. For example, the values 1555343273, 59107, 44, and 15937781 may be represented in four contiguous words in a first register, wherein each word comprises four bytes: [0x5CB4A7A9, 0x0000E6E3, 0x0000002C, 0x00F330F5]. After performing the flbpk instruction, the four values may be represented in four bytes, two bytes, one byte, and three bytes, respectively, in a second register: [0x5CB4A7A9, 0xE6E3, 0x2C, 0xF330F5]. In an embodiment, the rest of the second register is padded with zeros. For example, if the second register is 16 bytes long, then the second register may include the following bit-vector: [0x5CB4A7A9, 0xE6E3, 0x2C, 0xF330 F5, 0x000000000000].

Example Syntax

In an embodiment, the flbpk instruction takes the following operands: a pointer into memory, which is stored in a first register, that the variable-length byte values will be stored in; a second register containing the unpacked fixed-length values; a third register with corresponding target-length values that represent the number of bytes that should be used to represent each corresponding variable-length value. A completer may be used to indicate the length of each fixed-length value. For example, the flbpk instruction may be in the form of:

flbpkx [r1]=r2, r3, r4.

In this example instruction, the unpacked fixed-length values contiguously stored in r2 (referred to herein as a "source register") are packed into variable-length representations stored in memory at an address specified in register r1, based on the corresponding target-length values stored in r3. Register r3 may, but need not be a SIMD register. The total length of the resulting variable-length representations (referred to herein as the "total-length value") may be stored in r4. In an embodiment, the flbpk instruction need not include an operand, such as r4, which the processor is configured populate with the total length of the resulting variable-length representations. Additionally or alternatively, the processor may be configured to update the pointer r1 by the total length of the result variable-length representations. The completer, x, indicates the length of each unpacked fixed-length value in r2. For example, flbpk4 indicates that the fixed-length values in r2 are each four bytes long.

For purposes of illustrating a clear example, assume [0x00F330F5, 0x000000002C, 0x0000E6E3, 0x5CB4A7A9] is a vector of unpacked fixed-length values stored in register r2, and corresponding target-length values, [3, 1, 2, 4], are stored in register r3. Upon execution of this instruction, the following variable-length representations of each value stored in register r2 is stored in memory at an address referenced in register r1: [0xF330F5, 0x2C, 0xE6E3, 0x5CB4A7A9]. The total length of the resulting vector of variable-length values (ten, which is the sum of each of the values in register r3) is stored in register r4.

In the example instruction above, the result in stored in memory. Additionally or alternatively, the results may be loaded in a register. The following is an example instruction that stores the results in a register:

flbpkx r1=r2, r3, r4.

In this example, the unpacked fixed-length values contiguously stored in r2 are packed into variable-length representations contiguously stored in register r1 (referred to herein as a "target register"), based on the corresponding target-length values stored in r3. Like the example above, the total length of the resulting variable-length representations may be stored in r4. The completer, x, indicates the length of each fixed-length value in r2.

There are many ways the flbpk instruction may be implemented. For example, the flbpk instruction may be implemented using one or more SIMD load, scatter, and/or shuffle instructions. Additionally or alternatively, a processor may comprise specialized circuitry to execute flbpk instructions. The term "specialized circuitry" refers to digital circuits that perform a set of functions, and that are either hardwired to perform the set of functions or persistently programmed to perform the set of functions. Persistently programmed digital circuits include digital electronic Application-Specific Integrated Circuits (ASICs) or Field Programmable Gate Arrays (FPGAs).

Scatter Mask Implementation

Figure 1:
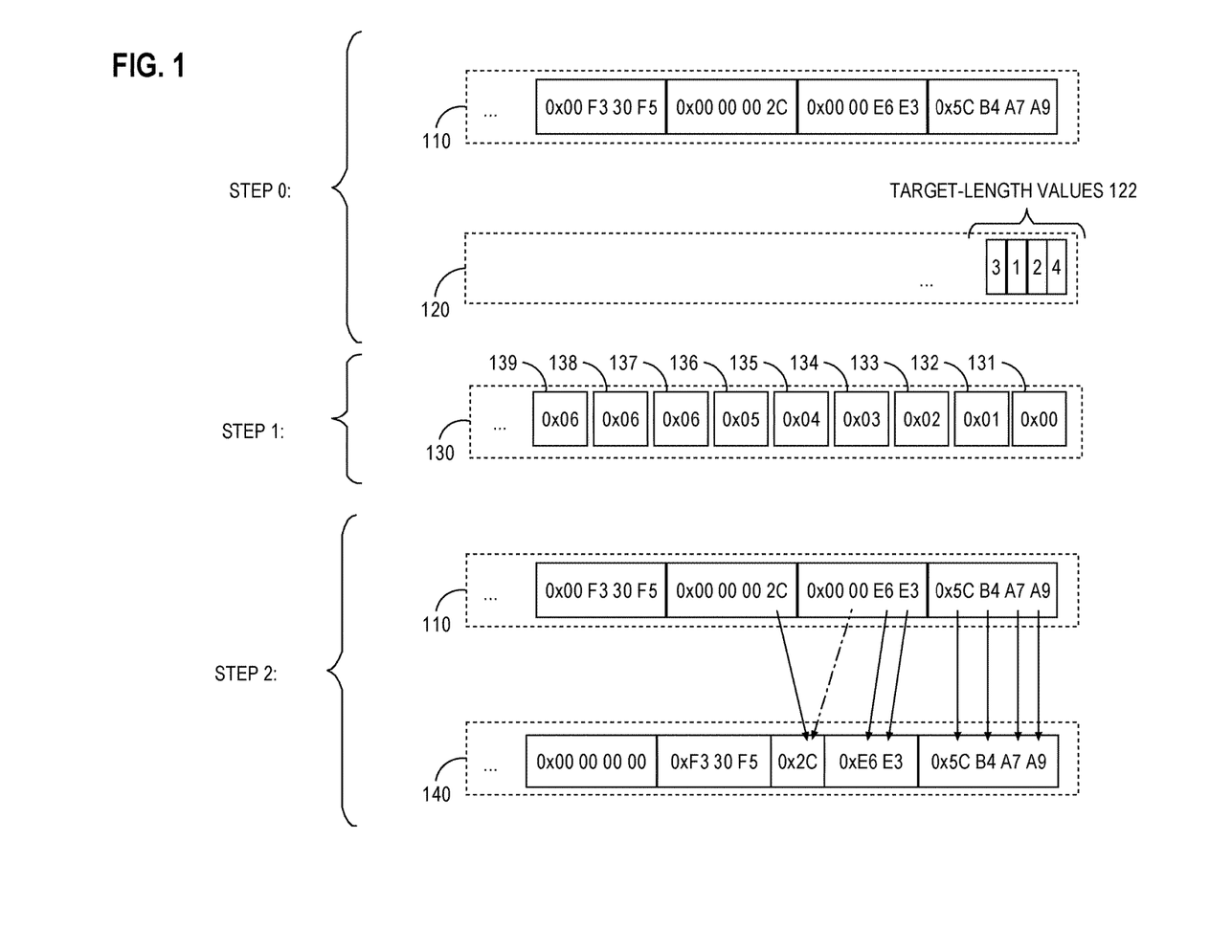
FIG. 1 illustrates a set of SIMD registers, scalar registers, and/or memory spaces and the states of the registers, memory spaces, and/or storages at various steps of performing a fixed-length byte pack (flbpk) instruction using a scatter mask in an example embodiment.

A scatter mask can be used to pack a series of fixed-length values into a series of variable-length values. FIG. 1 illustrates a set of SIMD registers, scalar registers, and/or memory spaces and the states of the registers, memory spaces, and/or storages at various steps of performing a fixed-length byte pack (flbpk) instruction using a scatter mask in an example embodiment. Each of the registers illustrated in FIG. 1 may be a scalar register or a SIMD register. For purposes of illustrating a clear example, in FIG. 1, source register 110 and target register 140 are scalar registers, register 120 and register 130 are SIMD registers. In the embodiment illustrated in FIG. 1, each fixed-length value in source register 110 is four bytes long, and each subregister in SIMD register 130 is one byte; however, in other embodiments, the fixed-length values greater or fewer bytes, and the subregisters may be longer than a greater byte. Source register 110 may be larger than target register 140.

In step 0: In preparation for the flbpk instruction, a vector of fixed-length values are loaded into a first register, and a vector of target-length values is loaded into another register. For example, [0x00F330F5, 0x000000002C, 0x0000E6E3, 0x5CB4A7A9] is loaded into source register 110, and target-length values 122 ([3, 1, 2, 4]) is loaded in to register 120. In an embodiment, register 120 is a SIMD register and each target-length value in the vector of target-length values is stored in a subregister in register 120, respectively.

Each fixed-length value in source register 110 may be represented in at least the number of bytes indicated by a corresponding target-length value in the series of target-length values loaded in register 120. For example, 0x00F330F5 can be represented with three bytes: 0xF330F5; 0x000000002C can be represented with one byte: 0x2C; 0x0000E6E3 can be represented with two bytes: 0xE6E3; and, 0x5CB4A7A9 can be represented with four bytes. In an embodiment, each target-length value indicates the minimum number of bytes that the corresponding fixed-length value can be stored in.

Loading a Scatter Mask

In Step 1: a scatter mask is loaded into a register, such as SIMD register 130. The scatter mask maps each "source" byte in a first register to a "target" byte in a second register.

There are many ways to load a scatter mask into a SIMD register. For example, based on the vector of target-length values loaded in a register, a processor may generate a scatter mask at run-time, and load the scatter mask into a SIMD register. Additionally or alternatively, a processor may query a pre-defined scatter-mask lookup table, which maps vectors of target-length values to scatter masks, for a particular scatter mask that is mapped to a particular vector of target-length values. Accordingly, a vector of target-length values, and/or one or more values in the vector of target-length values, may be used as a key. If a lookup table includes a mapping from a particular vector of target-length values to a particular scatter mask, then the processor may load the particular scatter mask into a SIMD register; otherwise, the processor may generate a new scatter mask at run-time and create a new mapping in the lookup table that maps the particular vector of target-length values to the new scatter mask. Generating a scatter mask is discussed in detail below.

A single vector of target-length values may map to more than one scatter mask. For purposes of illustrating a clear example, assume the following:
Two vectors of fixed-length values may have the same target-length values: [3, 1, 2, 3];
Each vector of fixed-length values has four values;
Each value in the first vector of fixed-length values is three bytes long;
Each value in the second vector of fixed-length values is four bytes long.

The correct scatter mask for the first vector of fixed-length values is the following:
[0x08 08 08 08|08 07 06|06 06 05|05 04 03|02 01 00];
The correct scatter mask for the second vector of fixed-length values is the following:
[0x08 08 07 06|06 06 06 05|05 05 04 03|03 02 01 00].

Accordingly, a different scatter-mask lookup table may be maintained for each fixed-length. The processor may determine which scatter-mask lookup table to use based on the size of each fixed-length value in the source register and/or the completer used with flbpk instruction. For example, if the completer for the flbpk instruction is 4 (flbpk4 [r1]=r2, r3, r4), then the processor may use the scatter-mask lookup table that comprises scatter masks for fixed-length values that are each four bytes long. If the completer for the flbpk instruction is 2 (flbpk2 [r1]=r2, r3, r4), then the processor may use the scatter-mask lookup table that comprises scatter masks for fixed-length values that are each two bytes long. Accordingly, for each lookup table, each vector of fixed-length values may be a unique key into the lookup table.

A processor may use specialized circuitry to load a scatter mask into a SIMD register. For example, a processor may comprise one or more gates with one or more scatter-mask lookup tables embedded in the gates.

The number of scatter masks in each scatter-mask lookup table may vary based on the length of each fixed-length value, and/or the number of fixed-length values, that the mask should be applied to. In the example above, the scatter-mask lookup table with the second scatter mask will have more entries than the scatter-mask lookup table with the first scatter mask because there are more possible scatter mask combinations for packing four 4-byte values into a vector of variable-length values than four 3-byte values into a vector of variable-length values.

Some scatter-mask lookup tables may be too large for a single gate in a gate array. Accordingly, scatter-mask lookup tables may be divided up between gates based on one or more factors. For example, each gate in a gate array may store a scatter-mask lookup table associated with a completer that indicates the length of the fixed-length values that each scatter mask in the gate can be applied to. When a processor executes the flbpkx instruction with a vector of target-length values loaded in a register, the gate associated with the specific completer (x) is configured to look up a scatter mask that matches the vector of target-length values and loads the matching scatter mask in to a SIMD register, such as SIMD register 130.

Additionally or alternatively, a scatter-mask lookup table may be divided into multiple sub-lookup tables, each of which is stored in a different gate. A scatter-mask lookup table may be too long to store in one gate; thus, the scatter-mask lookup table can be divided among a set of gates. For example, each entry in a scatter-mask lookup table that has the same one or more first target-length values can be stored in a first gate, and each entry in the scatter-mask lookup table that has the same one or more second target-length values can be stored in a second gate. When a processor executes the flbpkx instruction with a particular vector of target-length values loaded in a register, if one or more target-length values in the particular vector of target-length values, such as target-length values 122, match the one or more first target-length values, then the first gate looks up the scatter mask that matches the particular vector of target-length values and loads the matching scatter mask in to a SIMD register, such as SIMD register 130. If the one or more target-length values in the particular vector of target-length values match the one or more second target-length values, then the second gate looks up the scatter mask that matches the particular vector of target-length values and loads the matching scatter mask in to the SIMD register. Also for example, if register 120 is a SIMD register, then the target-length value(s) stored in the first one or more sub-register is register 120 may be used to determine which gate includes the correct scatter-mask sub-lookup table.

Applying the Scatter Mask

In step 2: the packed variable-length values are loaded in a register and/or memory by applying the scatter mask to the fixed-length values. For example, the first six bytes in source register 110, [0xE6, E3 5C B4 A7 A9], are loaded into the first six bytes of target register 140; the ninth byte in source register 110, 0x2C, is loaded into the seventh byte of target register 140; and bytes 13-15 of source register 110, [0xF3 30 F5], are loaded into bytes 8-10 in target register 140.

A processor that supports SIMD operations may apply multiple values ("scatter values") in a scatter mask to multiple source bytes in parallel because each scatter value in the in a scatter mask is loaded in a different subregister of a SIMD subregister. For example, in FIG. 1, SIMD register 130 comprises multiple subregisters: subregister 131 through subregister 139; each subregister includes a scatter value that corresponds to a source byte, and maps the source byte to the target byte that the source byte should be loaded into. Specifically, subregister 131 is the first subregister in SIMD register 130, which corresponds to the first byte in source register 110; the value in subregister 131 (0x00) indicates that the first byte in source register 110 should be copied to the first byte target register 140. Subregister 139 is the ninth subregister in SIMD register 130, which corresponds to the ninth byte in source register 110; the value in subregister 139 (0x06) indicates that the ninth byte in source register 110 should be copied into the seventh byte in target register 140.

The length of each subregister in a SIMD register with the scatter mask includes at least the number of bits needed to address each target byte in the target register that a source byte may be copied into. For example, if a source register 110 has 64 four-byte values, then the resulting variable-length values in target register 140 may be 256 or fewer bytes. Eight bits are needed to address each byte in a series of 256 bytes indexed from zero to 255; accordingly, in this example, each subregister in SIMD register 130 includes at least eight bits, or one byte. Also for example, if the resulting variable-length values in a target register 140 could be packed into at most 512 bytes, then at least nine bits are needed to address each of the 512 bytes (zero to 511); however, typically subregisters include a number of bits that is a power of two, such as 4, 8, 16, 32, etc. Thus, each subregister in SIMD register 130 may include 16 bits, or two bytes, if the resulting variable-length values in target-register 140 could be packed into at most 512 bytes.

In an embodiment, the most significant source byte or subregister overrides any value and/or subregister that may be loaded into, and/or mapped to, the same target byte. For example, in FIG. 1, subregister 136 corresponds with the seventh source byte in source register 110, and indicates that the value (0x00) in the seventh source byte should be stored in the seventh byte in target register 140. Instead, the seventh byte in the target register 140 includes the value from the ninth source byte in source register 110, because the most significant source byte and/or subregister, which in this case is the left-most byte and/or subregister in either source register 110 or SIMD register 130, overrides any value and/or subregister that may be loaded into, and/or mapped to, the same target byte. However, in an embodiment, the least significant source byte and/or subregister, which in this case is the right-most byte and/or subregister either source register 110 or SIMD register 130, overrides any value and/or subregister that may be loaded into, and/or mapped to, the same target byte.

In an embodiment, one source byte and/or mapping may not necessarily override another source byte competing for the same target byte. Accordingly, a source byte that should not be copied to a target byte that is part of the contiguous variable-length values in a target register may be copied to a "junk" byte in the target register. For purposes of illustrating a clear example, assume the following:

There are 256 bytes in source register 110 and target register 140, which are addressable from zero to 255 (0x00 to 0xFF);
There are 64 four-byte values source register 110;
At least one value in the 64 four-byte values may be represented with fewer than four bytes.

Since at least one value in the 64 values may be represented with fewer than four-bytes, then at least the last byte (addressable as 0xFF) in target register 140 is a junk byte, or in other words, not used to represent the variable-length values contiguously stored in the target register. Thus, each scatter mask value that corresponds with a source byte that should not be copied to a target byte that is part of the contiguously packed variable-length values may be mapped to the last byte in target register 140: 0xFF, which is a dedicated junk byte. Specifically in FIG. 1, the mask value stored in subregister 136, which corresponds to the seventh source byte, may be 0xFF. Since at least the last byte is a junk byte, the processor need not define which source byte overrides another source byte for the same target byte.

Storing the Variable-Length Values in Memory

After the variable-length values are loaded in the target register, the processor may store the variable-length values in memory. For example, using the memory-based syntax, the processor may store a vector of variable-length values in target register 140 in memory beginning at an address loaded in a register r1 (not illustrated in FIG. 1).

In an embodiment, in preparation for executing another flbpk instruction and storing the results contiguously in memory with a previously generated vector of variable-length values, the processor updates the address stored in r1 by the total-length value. A total-length value applied to a memory address stored in a register and/or memory may be referred to herein as an offset. Additionally or alternatively, the processor may store the total-length value in a register, such as r4 (not illustrated in FIG. 1). For purposes of illustrating a clear example, assume the following:

The address stored in r1 is 0x000000000.
Source register 110 and target register 140 are each 64 bytes long;
Source register 110 includes a first vector of 16 four-byte values;
In response to receiving the flbpk instruction, the processor packs the first vector of 16 four-byte values into a first vector of 49 contiguous bytes in target register 140, and writes all 64 bytes in target register 140 to the memory address stored in r1.

The processor increments register r1 by 49. Accordingly, the address loaded in r1 is now 0x000000031. Additionally or alternatively, the processor may store the total length of a vector of packed variable-length values in a register, such as r4 (not illustrated in FIG. 1). In response to executing the flbpk instruction again, a second vector of values is packed into a second vector of variable-length values; the second vector of variable-length values are stored in memory beginning at the new address stored in r1: 0x000000031. In preparation for executing the flbpk instruction again, the processor updates register r1 based on the total length of the second vector of variable-length values.

There are many ways of determining the total length of the most recently packed variable-length values. For example, the sum of the target-lengths loaded in register 120 equals the total length of the packed variable-length values. A processor may compute the sum at run-time.

Additionally or alternatively, a processor may query a lookup table, which maps vectors of target-length values to total-length values, for a particular total-length value that is mapped to a particular vector of target-length values; the processor may load the particular total-length value into a register and/or add the particular total-length value to the register with the output memory address, which in this example is r1. If a lookup table does not include a mapping from a particular vector of target-length values to a particular total-length value, then the processor may calculate a new total-length value at run-time and create a new mapping in the lookup table that maps the particular vector of target-length values to the new total-length value.

A vector of target-length values maps to the same total-length value, regardless of the completer or the length of the fixed-length values. For purposes of illustrating a clear example, assume the following:

Two vectors of fixed-length values have the same target-length values: [3, 1, 2, 3];
Each vector of fixed-length values has four values;
Each value in the first vector of fixed-length values is three bytes long;
Each value in the second vector of fixed-length values is four bytes long.

The total-length value for either target-length values is 9 (3+1+2+3). Accordingly, while a processor may maintain multiple scatter-mask lookup tables, each of which is associated with a different completer, a processor may maintain a single total-length lookup table. Additionally or alternatively, a scatter-mask lookup table may include the corresponding total-length value. The processor may load the particular total-length value into a register, such as r4, when the scatter mask is loaded. Additionally or alternatively, the processor may add the particular total-length value to a register with the output memory address, such as r1.

A processor may use specialized circuitry to load a particular total-length value into a register and/or add the particular total-length value to a register with the output memory address. For example, a target-length lookup table may be stored in a gate, as discussed above with a scatter-mask lookup table. In response to executing the flbpk instruction with a particular vector of target-length values, the processor may cause a gate to look up the corresponding total-length value. The processor may load the particular total-length value from the total-length lookup table into a register and/or add the particular total-length value to the register with the output memory address.

Additionally or alternatively, a target-length lookup table may be divided into multiple sub-lookup tables, each of which is stored in a different gate. For example, each entry in a total-length lookup table that has the same one or more first target-length values can be stored in a first gate, and each entry in the total-length mask lookup table that has the same one or more second target-length values can be stored in a second gate. When a processor executes the flbpk instruction with a particular vector of target-length values loaded in a register, if one or more particular target-length values in the particular vector of target-length values matches the one or more first target-length values, then the first gate looks up the total-length value that matches the particular vector of target-length values and loads the matching total-length value into a register and/or adds the matching total-length value to a register with an output memory address, such as r1. If the one or more particular target-length values in the particular vector of target-length values matches the one or more second target-length values, then the second gate looks up the total-length value that matches the particular vector of target-length values and loads the matching total-length value into a register and/or adds the matching total-length value to a register with an output memory address.

The example included herein, memory grows as the offset is incremented. For example, in response to the flbpk instructions, the processor may increment r1 by the total-length value. In an embodiment, memory grows as the offset is decremented. For example, in response to the flbpk instructions, the processor may decrement r1 by the total-length value.

Generating a Scatter Mask and a Total-Length Value

Snippet 1 is pseudo code that may be used to generate a scatter mask and a total-length value based on a vector of target-length values in an example embodiment. Snippet 1 or code based Snippet 1, such as byte code or machine code, may be executed to generate a scatter mask.

Snippet 1:

```
line 1: var x=0, y=0, max_length=4, scatter_mask=[ ],
        num_source_values=16, target_lengths=[4,2,1,3];
line 2: for ( var x=0; x < num_source_values; x++ ) {
line 3:     var target_value_index = Math.floor(x/max_length);
line 4:     var mod = x % max_length;
line 5:     scatter_mask[x] = y;
line 6:     if ( mod < target_lengths[target_value_index] ) {
line 7:         y++;
line 8:     }
line 9: }
```

After the pseudo code above is executed, a scatter mask with sixteen scatter values is loaded in an array named scatter_mask, and the total-length value is stored in a variable named y. Each value in scatter_mask corresponds with a source byte in a source register, and indicates which target byte the source byte should be copied to. For example, the first value in scatter_mask corresponds to a first byte in a source register ("first source byte"), and indicates which byte in the target register the first source byte should be copied into. The second value in scatter_mask corresponds to a second byte in the source register ("second source byte"), and indicates which byte in the target register the second source byte should be copied into.

For purposes of illustrating a clear example, in Snippet 1, line 1, the source register is defined to be 16 bytes long (num_source_values) and includes four values, each of which is four bytes long (max_length); the target lengths (target_lengths) are [4, 2, 1, 3] (unlike FIG. 1, in Snippet 1, the first or least-significant bytes or elements are the left-most bytes or elements). After Snippet 1 is executed, scatter_mask includes 16 scatter values, each of which is one byte, for a total of 16 bytes; the total-length value, y, is set to 10 (4+2+1+3). The first 10 scatter values in scatter_mask are illustrated in SIMD register 130 in FIG. 1; however, in FIG. 1 the first or least significant bytes or elements are the right-most bytes or elements.

Shuffle Mask Implementation

Figure 2:
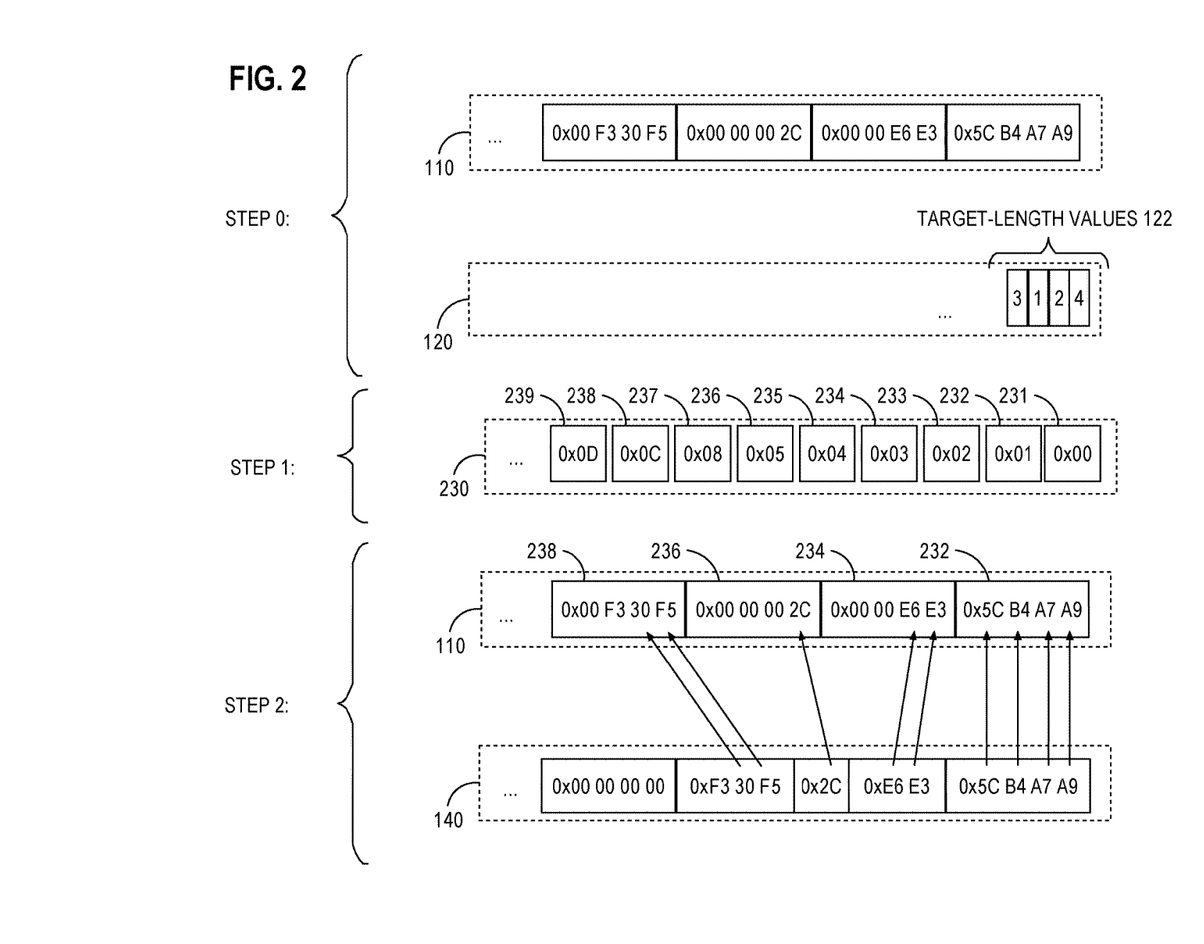
FIG. 2 illustrates a set of SIMD registers, scalar registers, and/or memory spaces and the states of the registers, memory spaces, and/or storages at various steps of performing a fixed-length byte pack (flbpk) instruction using a shuffle mask in an example embodiment.

A shuffle mask can be used to pack a series of fixed-length values into a series of variable-length values. A shuffle mask includes a shuffle value for each target byte in a target register; each shuffle value indicates which source byte the target byte should be copied from. FIG. 2 illustrates a set of SIMD registers, scalar registers, and/or memory spaces and the states of the registers, memory spaces, and/or storages at various steps of performing a fixed-length byte pack (flbpk) instruction using a shuffle mask in an example embodiment. FIG. 2 includes source register 110, register 120, and target register 140 as discussed in FIG. 1; however, in FIG. 2, SIMD register 230, which may be the same register as SIMD register 130; however, SIMD register 230 contains a shuffle mask rather than a scatter mask.

In FIG. 2, step 0, like step 0 in FIG. 1: A vector of fixed-length values are loaded in source register 110. A vector of corresponding target-length values, which includes target-length values 122, is stored in register 120.

Loading a Shuffle Mask

In Step 1: a shuffle mask is loaded into a register, such as SIMD register 130. A shuffle mask maps each "target" byte in a first register to a "source" byte in a second register.

There are many ways to load a shuffle mask into a SIMD register. For example, based on the vector of target-length values loaded in a register, a processor may generate a shuffle mask at run-time, and load the shuffle mask into a SIMD register. Additionally or alternatively, a processor may query a pre-defined shuffle-mask lookup table, which maps vectors of target-length values to shuffle masks, for a particular shuffle mask that is mapped to a particular vector of target-length values. If a lookup table includes a mapping from a particular vector of target-length values to a particular shuffle mask, then the processor may load the particular shuffle mask into a SIMD register; otherwise, the processor may generate a new shuffle mask at run-time and create a new mapping in the lookup table that maps the particular vector of target-length values to the new shuffle mask. Generating a shuffle mask is discussed in detail below.

A single vector of target-length values may map to more than one shuffle mask. For purposes of illustrating a clear example, assume the following:

Two vectors of fixed-length values may have the same target-length values: [3, 1, 2, 3];

Each vector of fixed-length values has four values;
Each value in the first vector of fixed-length values is three bytes long;
Each value in the second vector of fixed-length values is four bytes long.

The correct shuffle mask for the first vector of fixed-length values is the following:
[0x0C 0C 0C 0C 0C 0C 0C|0B 0A 09|06|04 03|02 01 00];

The correct shuffle mask for the second vector of fixed-length values is the following:
[0x0F 0F 0F 0F 0F 0F 0F|0E 0D 0C|08|05 04|02 01 00].

Accordingly, a different shuffle-mask lookup table may be maintained for each fixed-length value. The processor may determine which shuffle-mask lookup table to use based on the size of each fixed-length value in the source register and/or the completer used with flbpk instruction as discussed above with scatter-mask lookup tables.

A processor may use specialized circuitry to load a shuffle mask into a SIMD register. For example, a processor may comprise one or more gates with one or more shuffle-mask lookup tables embedded in the gates.

Like scatter-mask lookup tables, the number of shuffle masks in each shuffle-mask lookup table may vary based on the length of each fixed-length value, and/or the number of fixed-length values, that the mask is used to copy from the source register. In the example above, the shuffle-mask lookup table with the second shuffle mask will have more entries than the shuffle-mask lookup table with the first shuffle mask because there are more possible shuffle mask combinations for packing four 4-byte values into a vector of variable-length values than four 3-byte values into a vector of variable-length values.

Some shuffle-mask tables may be too large for a single gate in a gate array. Accordingly, shuffle-mask lookup tables may be divided up between gates based on one or more factors as discussed in details above with scatter-mask lookup tables. Additionally or alternatively, a shuffle-mask lookup table may be divided into multiple sub-lookup tables, each of which is stored in a different gate and used as discussed above with scatter-mask lookup tables and sub-lookup tables.

Applying the Shuffle Mask

In step 2: the packed variable-length values are loaded in a register and/or memory by copying values from the source register to the target register based on the shuffle mask. For example, the first six bytes in source register 110, [0xE6, E3 5C B4 A7 A9], are loaded into the first six bytes of target register 140; the ninth byte in source register 110, 0x2C, is loaded into the seventh byte of target register 140; and bytes 13-15 of source register 110, [0xF3 30 F5], are loaded into bytes 8-10 in target register 140.

A processor that supports SIMD operations may copy multiple values from the source register into the target register in parallel because each shuffle value in the in a shuffle mask is loaded in a different subregister of a SIMD subregister. For example, in FIG. 2, SIMD register 230 comprises multiple subregisters: subregister 231 through subregister 239; each subregister includes a shuffle value that corresponds to a target byte, and maps the target byte to a source byte. Specifically, subregister 231 is the first subregister in SIMD register 230, which corresponds to the first byte in target register 140; the value in subregister 231 (0x00) indicates that the first byte in source register 110 should be copied to the first byte target register 140. Subregister 239 is the ninth subregister in SIMD register 130, which corresponds to the ninth byte in target register 140; the value in subregister 239 (0x0D) indicates that the thirteenth byte in source register 110 should be copied into the ninth byte in target register 140.

The length of each subregister in a SIMD register with the shuffle mask includes at least the number of bits needed to address each source byte in the source register that should be copied into a target byte in the target register. For purposes of illustrating a clear example, assume source register 110 is at least 256 bytes long and includes 64 four-byte values, which span 256 bytes. Eight bits are needed to address each byte in a series of 256 bytes indexed from zero to 255; accordingly, in this example, each subregister in SIMD register 230 includes at least eight bits, or one byte. Also for example, assume source register 110 is at least 512 bytes long and includes more 128 four-byte values, which span 512 bytes. At least nine bits are needed to address each of the 512 bytes (zero to 511); however, typically subregisters are byte-aligned and/or include a number of bits that is a power of two, such as 4, 8, 16, 32, etc. Thus, each subregister in SIMD register 230 may include 16 bits, or two bytes.

Storing the Variable-Length Values in Memory

After the variable-length values are loaded in the target register, the processor may store the variable-length values in memory as discussed above. Additionally or alternatively, in preparation for executing another flbpk instruction and storing the results contiguously in memory with a previously generated vector of variable-length values, the processor updates the address stored in r1 by the total-length value as discussed above. Additionally or alternatively, the processor may store the total-length value in a register, also discussed above.

Generating a Shuffle Mask and a Total-Length Value

Snippet 2 is pseudo code that may be used to generate a shuffle mask and a total-length value based on a vector of target-length values in an example embodiment. Snippet 1 or code based Snippet 1, such as byte code or machine code, may be executed to generate a shuffle mask.

Snippet 2:

```
line 1: var x=0, max_length=4, shuffle_mask=[ ],
    target_lengths=[4,2,1,3];
line 2: for ( var y = 0; y < target_lengths.length; y++ ) {
line 3:     var target_value = target_lengths[y];
line 4:     for ( var i = 0; i < target_value; i ++ ) {
line 5:         shuffle_mask[x] = y * max_length + i;
line 6:         x++;
line 7:     }
line 8: }
```

After the pseudo code above is executed, a shuffle mask with sixteen shuffle values is loaded in an array named shuffle_mask, and the total-length value is stored in a variable named x. Each value in shuffle_mask corresponds with a target byte in a target register, and indicates which source byte should be copied to the target byte. For example, the first value in shuffle_mask corresponds to a first byte in a target register ("first target byte"), and indicates which byte in the source register should be copied into the first target byte. The second value in shuffle_mask corresponds to a second byte in the target register ("second target byte"), and indicates which byte in the source register should be copied into the second target byte.

For purposes of illustrating a clear example, in Snippet 2, line 1, the source register includes four values, each of which is four bytes long (max_length); the target lengths (target_lengths) are [4, 2, 1, 3] (unlike FIG. 2, in Snippet 2, the first or least-significant bytes or elements are the left-most bytes or elements). After Snippet 2 is executed, shuffle_mask includes 16 shuffle values, each of which is one byte, for a total of 16 bytes; the total-length value, x, is set to 10 (4+2+1+3). The first 10 shuffle values in shuffle_mask are illustrated in SIMD register 130 in FIG. 2; however, in FIG. 2 the first or least significant bytes or elements are the right-most bytes or elements.

Variations

The examples included above are not intended to be limiting. The instructions discussed above may be implemented on many various hardware configurations that are different than those illustrated. For example, in other embodiments, the "lowest" bytes (the least significant bytes, elements, and/or registers) are on the right side of registers or memory. Additionally some bit-vectors, registers, and/or subregisters by include a sign bit.

While the methods described above may be focused on SIMD architecture, these methods may also be implemented scalar and/or other non-SIMD instructions. For example, SIMD register 120 may be scalar register. The methods may also be included as part of an application programming interface. Furthermore, the methods may implemented as an intrinsic, which may be a function a compiler recognizes and replaces with a particular block of assembly or machine code. Further still, one or more instructions may be stored on one or more non-transitory computer-readable mediums, which when executed by one or more processors, may cause one or more of the methods described herein to be performed.

In many of the examples, a SIMD register comprises four or ten subregisters. This is not intended to be limiting in any way. SIMD registers may comprise more or fewer subregisters, all of which may be varying lengths.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
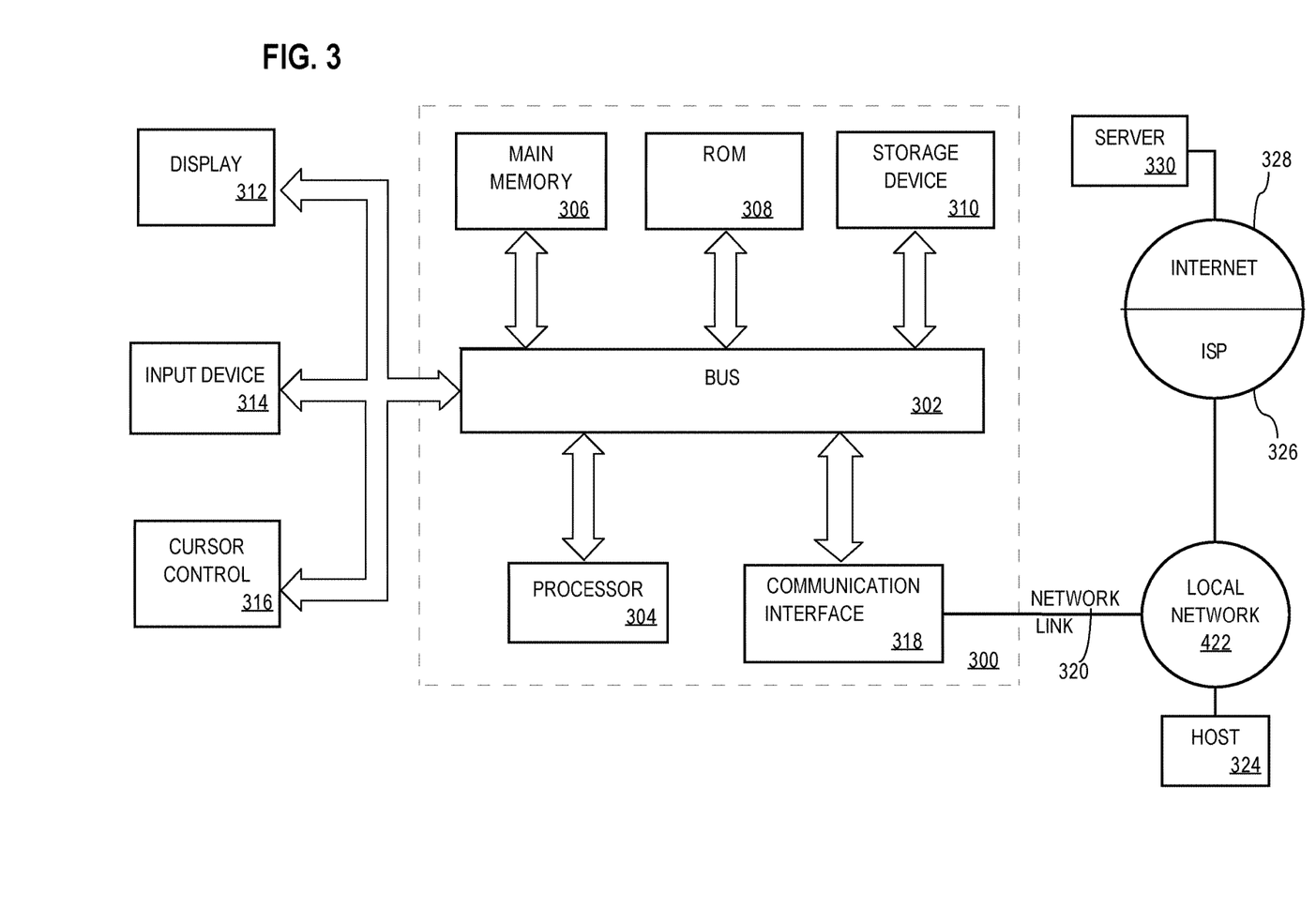
FIG. 3 is a block diagram that illustrates a computer system upon which an embodiment of the invention may be implemented.

For example, FIG. 4 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory, computer-readable media storing one or more instructions that, when executed by one or more processors, cause producing a vector of variable-length values from a vector of fixed-length values;
    wherein a first register stores a plurality of fixed-length values from the vector of fixed-length values, wherein each fixed-length value in the vector of fixed-length values is a variable-length value that has been padded, as needed, to achieve a particular fixed length,
    wherein a series of single instruction multiple data (SIMD) subregisters of a second register stores a plurality of length values from a vector of lengths, wherein each fixed-length value in the vector of fixed-length values corresponds to a length value in the vector of lengths, and wherein each length value in the vector of lengths indicates an unpadded length of a corresponding fixed-length value in the vector of fixed-length values;
    wherein the one or more instructions, when executed by the one or more processors, cause:
        storing, in a third register, the plurality of fixed-length values into the vector of variable-length values, wherein storing the vector of variable-length values in the third register is based on the vector of lengths, wherein each variable-length value in the vector of variable-length values is unpadded, and wherein a pointer specifies a memory address of the vector of variable length values stored in the third register;
        determining, based on the vector of lengths, a particular key in an offset lookup table;
        determining that a particular offset is indexed in the offset lookup table by the particular key;
        updating the pointer based on the particular offset.

2. The one or more non-transitory, computer-readable media of claim 1, wherein each length value in the vector of lengths indicates an unpadded length by indicating a minimum number of bytes needed to represent the fixed-length value to which said each length value corresponds.

3. The one or more non-transitory, computer-readable media of claim 1, wherein a first length in the vector of lengths is different than a second length in the vector of lengths.

4. The one or more non-transitory, computer-readable media of claim 1, wherein the one or more instructions, when executed by the one or more processors, cause:
    generating a scatter-mask based on the vector of lengths;
    storing, in a series of SIMD subregisters of a fourth register, the scatter-mask; and
    storing, in the third register, the plurality of fixed-length values into the vector of variable-length values based on the scatter-mask stored in the fourth register.

5. The one or more non-transitory, computer-readable media of claim 1, wherein a scatter-mask lookup table stores a plurality of scatter-masks, wherein each scatter-mask in the scatter-mask lookup table is indexed by a unique key;
    wherein the one or more instructions, when executed by the one or more processors, cause:
        determining, based on the vector of lengths, a particular key in the scatter-mask lookup table;
        determining that a particular scatter-mask is indexed by the particular key;

storing, in a series of SIMD subregisters of a fourth register, the particular scatter-mask; and storing, in the third register, the plurality of fixed-length values into the vector of variable-length values based on the particular scatter-mask stored in the fourth register.

6. The one or more non-transitory, computer-readable media of claim 1, wherein the one or more instructions, when executed by the one or more processors, cause:

generating a shuffle-mask based on the vector of lengths;

storing, in a series of SIMD subregisters of a fourth register, the shuffle-mask; and storing, in the third register, the plurality of fixed-length values into the vector of variable-length values based on the shuffle-mask stored in the fourth register.

7. The one or more non-transitory, computer-readable media of claim 1, wherein a shuffle-mask lookup table stores a plurality of shuffle-masks, wherein each shuffle-mask in the shuffle-mask lookup table is indexed by a unique key;

wherein the one or more instructions, when executed by the one or more processors cause:

determining, based on the vector of lengths, a particular key in the shuffle-mask lookup table;

determining that a particular shuffle-mask is indexed by the particular key;

storing, in a series of SIMD subregisters of a fourth register, the particular shuffle-mask; and storing, in the third register, the plurality of fixed-length values into the vector of variable-length values based on the particular shuffle-mask stored in the fourth register.

8. A method for producing a vector of variable-length values from a vector of fixed-length values;

wherein a first register stores a plurality of fixed-length values from the vector of fixed-length values, wherein each fixed-length value in the vector of fixed-length values is a variable-length value that has been padded, as needed, to achieve a particular fixed length, wherein a series of single instruction multiple data (SIMD) subregisters of a second register stores a plurality of length values from a vector of lengths, wherein each fixed-length value in the vector of fixed-length values corresponds to a length value in the vector of lengths, and wherein each length value in the vector of lengths indicates an unpadded length of a corresponding fixed-length value in the vector of fixed-length values;

the method comprising:

storing, in a third register, the plurality of fixed-length values into the vector of variable-length values, wherein storing the vector of variable-length values in the third register is based on the vector of lengths, wherein each variable-length value in the vector of variable-length values is unpadded, and wherein a pointer specifies a memory address of the vector of variable length values stored in the third register;

determining, based on the vector of lengths, a particular key in an offset lookup table;

determining that a particular offset is indexed in the offset lookup table by the particular key;

updating the pointer based on the particular offset.

9. The method of claim 8, wherein each length value in the vector of lengths indicates an unpadded length by indicating a minimum number of bytes needed to represent the fixed-length value to which said each length value corresponds.

10. The method of claim 8, wherein a first length in the vector of lengths is different than a second length in the vector of lengths.

11. The method of claim 8, the method further comprising:

generating a scatter-mask based on the vector of lengths;

storing, in a series of SIMD subregisters of a fourth register, the scatter-mask; and storing, in the third register, the plurality of fixed-length values into the vector of variable-length values based on the scatter-mask stored in the fourth register.

12. The method of claim 8, wherein a scatter-mask lookup table stores a plurality of scatter-masks, wherein each scatter-mask in the scatter-mask lookup table is indexed by a unique key;

wherein the method further comprising:

determining, based on the vector of lengths, a particular key in the scatter-mask lookup table;

determining that a particular scatter-mask is indexed by the particular key;

storing, in a series of SIMD subregisters of a fourth register, the particular scatter-mask; and storing, in the third register, the plurality of fixed-length values into the vector of variable-length values based on the particular scatter-mask stored in the fourth register.

13. The method of claim 8, wherein the method further comprising:

generating a shuffle-mask based on the vector of lengths;

storing, in a series of SIMD subregisters of a fourth register, the shuffle-mask; and storing, in the third register, the plurality of fixed-length values into the vector of variable-length values based on the shuffle-mask stored in the fourth register.

14. The method of claim 8, wherein a shuffle-mask lookup table stores a plurality of shuffle-masks, wherein each shuffle-mask in the shuffle-mask lookup table is indexed by a unique key;

wherein the method further comprising:

determining, based on the vector of lengths, a particular key in the shuffle-mask lookup table;

determining that a particular shuffle-mask is indexed by the particular key;

storing, in a series of SIMD subregisters of a fourth register, the particular shuffle-mask; and storing, in the third register, the plurality of fixed-length values into the vector of variable-length values based on the particular shuffle-mask stored in the fourth register.

15. One or more non-transitory, computer-readable media storing one or more instructions that, when executed by one or more processors, cause producing a vector of variable-length values from a vector of fixed-length values;

wherein a first register stores a plurality of fixed-length values from the vector of fixed-length values, wherein each fixed-length value in the vector of fixed-length values is a variable-length value that has been padded, as needed, to achieve a particular fixed length, wherein a series of single instruction multiple data (SIMD) subregisters of a second register stores a plurality of length values from a vector of lengths, wherein each fixed-length value in the vector of fixed-length values corresponds to a length value in the vector of lengths, and wherein each length value in the vector of lengths indicates an unpadded length of a corresponding fixed-length value in the vector of fixed-length values;

wherein a scatter-mask lookup table stores a plurality of scatter-masks;
wherein the one or more instructions, when executed by the one or more processors, cause:
  determining, based on the vector of lengths, a particular key in the scatter-mask lookup table;
  determining that the particular key indexes a particular scatter-mask;
  storing, in a third register and based on the particular scatter-mask, the plurality of fixed-length values into the vector of variable-length values, wherein each variable-length value in the vector of variable-length values is unpadded.

16. The one or more non-transitory, computer-readable media of claim 15, wherein each length value in the vector of lengths indicates an unpadded length by indicating a minimum number of bytes needed to represent the fixed-length value to which said each length value corresponds.

17. The one or more non-transitory, computer-readable media of claim 15, wherein the one or more instructions, when executed by the one or more processors, cause:
  storing, in a series of SIMD subregisters of a fourth register, the particular scatter-mask;
  storing, in the third register and based on the particular scatter-mask stored in the fourth register, the plurality of fixed-length values into the vector of variable-length values.

18. The one or more non-transitory, computer-readable media of claim 15, wherein the one or more instructions, when executed by the one or more processors, cause:
  storing the vector of variable-length values in the third register at an address specified by a pointer;
  determining an offset based on each length in the vector of lengths;
  updating the pointer based on the offset.

19. The one or more non-transitory, computer-readable media of claim 15, wherein the one or more instructions, when executed by the one or more processors, cause generating, based on the vector of lengths, each scatter-mask stored in the scatter-mask lookup table.

20. A method for producing a vector of variable-length values from a vector of fixed-length values;
  wherein a first register stores a plurality of fixed-length values from the vector of fixed-length values, wherein each fixed-length value in the vector of fixed-length values is a variable-length value that has been padded, as needed, to achieve a particular fixed length,
  wherein a series of single instruction multiple data (SIMD) subregisters of a second register stores a plurality of length values from a vector of lengths, wherein each fixed-length value in the vector of fixed-length values corresponds to a length value in the vector of lengths, and wherein each length value in the vector of lengths indicates an unpadded length of a corresponding fixed-length value in the vector of fixed-length values;
  wherein a scatter-mask lookup table stores a plurality of scatter-masks;
  the method comprising:
  determining, based on the vector of lengths, a particular key in the scatter-mask lookup table;
  determining that the particular key indexes a particular scatter-mask;
  storing, in a third register and based on the particular scatter-mask, the plurality of fixed-length values into the vector of variable-length values, wherein each variable-length value in the vector of variable-length values is unpadded.

21. The method of claim 20, wherein each length value in the vector of lengths indicates an unpadded length by indicating a minimum number of bytes needed to represent the fixed-length value to which said each length value corresponds.

22. The method of claim 20, further comprising:
  storing, in a series of SIMD subregisters of a fourth register, the particular scatter-mask;
  storing, in the third register and based on the particular scatter-mask stored in the fourth register, the plurality of fixed-length values into the vector of variable-length values.

23. The method of claim 20, further comprising:
  storing the vector of variable-length values in the third register at an address specified by a pointer;
  determining an offset based on each length in the vector of lengths;
  updating the pointer based on the offset.

24. The method of claim 20, further comprising generating, based on the vector of lengths, each scatter-mask stored in the scatter-mask lookup table.

25. One or more non-transitory, computer-readable media storing one or more instructions that, when executed by one or more processors, cause producing a vector of variable-length values from a vector of fixed-length values;
  wherein a first register stores a plurality of fixed-length values from the vector of fixed-length values, wherein each fixed-length value in the vector of fixed-length values is a variable-length value that has been padded, as needed, to achieve a particular fixed length,
  wherein a series of single instruction multiple data (SIMD) subregisters of a second register stores a plurality of length values from a vector of lengths, wherein each fixed-length value in the vector of fixed-length values corresponds to a length value in the vector of lengths, and wherein each length value in the vector of lengths indicates an unpadded length of a corresponding fixed-length value in the vector of fixed-length values;
  wherein a shuffle-mask lookup table stores a plurality of shuffle-masks;
  wherein the one or more instructions, when executed by the one or more processors, cause:
    determining, based on the vector of lengths, a particular key in the shuffle-mask lookup table;
    determining that the particular key indexes a particular shuffle-mask;
    storing, in a third register and based on the particular shuffle-mask, the plurality of fixed-length values into the vector of variable-length values, wherein each variable-length value in the vector of variable-length values is unpadded.

26. The one or more non-transitory, computer-readable media of claim 25, wherein each length value in the vector of lengths indicates an unpadded length by indicating a minimum number of bytes needed to represent the fixed-length value to which said each length value corresponds.

27. The one or more non-transitory, computer-readable media of claim 25, wherein the one or more instructions, when executed by the one or more processors, cause:
  storing, in a series of SIMD subregisters of a fourth register, the particular shuffle-mask;

storing, in the third register and based on the particular shuffle-mask stored in the fourth register, the plurality of fixed-length values into the vector of variable-length values.

28. The one or more non-transitory, computer-readable media of claim 25, wherein the one or more instructions, when executed by the one or more processors, cause:
storing the vector of variable-length values in the third register at an address specified by a pointer;
determining an offset based on each length in the vector of lengths;
updating the pointer based on the offset.

29. The one or more non-transitory, computer-readable media of claim 25, wherein the one or more instructions, when executed by the one or more processors, cause generating, based on the vector of lengths, each shuffle-mask stored in the shuffle-mask lookup table.

30. A method for producing a vector of variable-length values from a vector of fixed-length values;
wherein a first register stores a plurality of fixed-length values from the vector of fixed-length values, wherein each fixed-length value in the vector of fixed-length values is a variable-length value that has been padded, as needed, to achieve a particular fixed length,
wherein a series of single instruction multiple data (SIMD) subregisters of a second register stores a plurality of length values from a vector of lengths, wherein each fixed-length value in the vector of fixed-length values corresponds to a length value in the vector of lengths, and wherein each length value in the vector of lengths indicates an unpadded length of a corresponding fixed-length value in the vector of fixed-length values;
wherein a shuffle-mask lookup table stores a plurality of shuffle-masks;
the method comprising:
determining, based on the vector of lengths, a particular key in the shuffle-mask lookup table;
determining that the particular key indexes a particular shuffle-mask;
storing, in a third register and based on the particular shuffle-mask, the plurality of fixed-length values into the vector of variable-length values, wherein each variable-length value in the vector of variable-length values is unpadded.

31. The method of claim 30, wherein each length value in the vector of lengths indicates an unpadded length by indicating a minimum number of bytes needed to represent the fixed-length value to which said each length value corresponds.

32. The method of claim 30, further comprising:
storing, in a series of SIMD subregisters of a fourth register, the particular shuffle-mask;
storing, in the third register and based on the particular shuffle-mask stored in the fourth register, the plurality of fixed-length values into the vector of variable-length values.

33. The method of claim 30, further comprising:
storing the vector of variable-length values in the third register at an address specified by a pointer;
determining an offset based on each length in the vector of lengths;
updating the pointer based on the offset.

34. The method of claim 30, further comprising generating, based on the vector of lengths, each shuffle-mask stored in the shuffle-mask lookup table.

* * * * *

UNITED STATES PATENT AND TRADEMARK OFFICE
CERTIFICATE OF CORRECTION

PATENT NO. : 11,113,054 B2
APPLICATION NO. : 15/211418
DATED : September 7, 2021
INVENTOR(S) : Chavan et al.

Page 1 of 2

It is certified that error appears in the above-identified patent and that said Letters Patent is hereby corrected as shown below:

On the Title Page

On page 2, Column 2, under item (56) Other Publications, Line 3, delete "harshtable," and insert -- hashtable, --, therefor.

On page 3, Column 1, under item (56) Other Publications, Line 5, delete "047/22/2014," and insert -- 07/22/2014, --, therefor.

On page 3, Column 1, under item (56) Other Publications, Line 22, delete "Aciton," and insert -- Action, --, therefor.

On page 3, Column 2, under item (56) Other Publications, Line 1, delete "Appollo" and insert -- Apollo --, therefor.

In the Specification

In Column 5, Line 67, delete "hardwired" and insert -- hard-wired --, therefor.

In Column 6, Line 31, delete "in to" and insert -- into --, therefor.

In Column 7, Line 59, delete "in to" and insert -- into --, therefor.

In Column 8, Line 11, delete "in to" and insert -- into --, therefor.

In Column 8, Line 16, delete "in to" and insert -- into --, therefor.

In Column 9, Lines 1-2, delete "target-register" and insert -- target register --, therefor.

In Column 15, Line 32, after "may" insert -- be --.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,113,054 B2

In the Claims

In Column 18, Line 32, in Claim 1, delete "variable length" and insert -- variable-length --, therefor.

In Column 19, Line 58, in Claim 8, delete "variable length" and insert -- variable-length --, therefor.